United States Patent
Mieda et al.

(10) Patent No.: US 11,384,988 B2
(45) Date of Patent: Jul. 12, 2022

(54) HEAT EXCHANGER

(71) Applicant: DENSO CORPORATION, Kariya (JP)

(72) Inventors: Hiroshi Mieda, Kariya (JP); Junji Kato, Kariya (JP); Hironobu Fujiyoshi, Kariya (JP)

(73) Assignee: DENSO CORPORATION, Kariya (JP)

( * ) Notice: Subject to any disclaimer, the term of this patent is extended or adjusted under 35 U.S.C. 154(b) by 118 days.

(21) Appl. No.: 16/708,168

(22) Filed: Dec. 9, 2019

(65) Prior Publication Data

US 2020/0116431 A1  Apr. 16, 2020

Related U.S. Application Data

(63) Continuation of application No. PCT/JP2018/022313, filed on Jun. 12, 2018.

(30) Foreign Application Priority Data

Jun. 13, 2017 (JP) .............................. JP2017-116053

(51) Int. Cl.
| | | |
|---|---|---|
| F28D 1/053 | (2006.01) | |
| F28F 9/02 | (2006.01) | |
| B23K 101/14 | (2006.01) | |
| B23K 1/00 | (2006.01) | |
| F25B 39/00 | (2006.01) | |
| F28D 21/00 | (2006.01) | |

(52) U.S. Cl.
CPC ............ *F28D 1/05391* (2013.01); *F28F 9/02* (2013.01); *B23K 1/0012* (2013.01); *B23K 2101/14* (2018.08); *F25B 39/00* (2013.01); *F28D 2021/0085* (2013.01)

(58) Field of Classification Search
CPC .................... F28D 1/05391; F28D 2021/0085; F28F 9/02; F28F 9/0204; F25B 39/00; F25B 39/02; B23K 2101/14; B23K 1/0012
USPC ......................................................... 165/173
See application file for complete search history.

(56) References Cited

U.S. PATENT DOCUMENTS

| | | | | |
|---|---|---|---|---|
| 5,190,101 A | * | 3/1993 | Jalilevand | .............. B21D 53/04 165/173 |
| 6,581,679 B2 | * | 6/2003 | Fischer | ............... F28D 1/05391 165/153 |
| 7,066,243 B2 | * | 6/2006 | Horiuchi | ................. F25B 39/02 165/174 |
| 7,273,093 B2 | * | 9/2007 | Durr | ..................... F28D 1/0535 165/153 |

(Continued)

FOREIGN PATENT DOCUMENTS

| | | |
|---|---|---|
| JP | H0579790 A | 3/1993 |
| JP | 200150686 A | 2/2001 |

(Continued)

*Primary Examiner* — Tho V Duong
*Assistant Examiner* — Raheena R Malik
(74) *Attorney, Agent, or Firm* — Harness, Dickey & Pierce, P.L.C.

(57) ABSTRACT

Each of tanks of a heat exchanger includes a tube joint portion and a tank body portion which define an internal space of the tank. The tube joint portions of the tanks constitute a single core plate. The tank body portions each have a claw protruding toward a core portion. The core plate is provided with a hole that fits with the claw. In a state in which the claw is fitted into the hole, the tank body portions are fixed to the core plate.

8 Claims, 13 Drawing Sheets

(56) References Cited

U.S. PATENT DOCUMENTS

| | | | |
|---|---|---|---|
| 2008/0296002 A1* | 12/2008 | Nishino | F28F 1/128 |
| | | | 165/148 |
| 2009/0095458 A1* | 4/2009 | Lim | F28F 9/0224 |
| | | | 165/174 |
| 2009/0236086 A1* | 9/2009 | Higashiyama | F28D 1/05391 |
| | | | 165/176 |
| 2012/0222848 A1* | 9/2012 | Sicks | F28D 1/05391 |
| | | | 165/173 |
| 2013/0048260 A1 | 2/2013 | Matsumoto et al. | |
| 2013/0074340 A1* | 3/2013 | Hirayama | B23P 15/26 |
| | | | 29/890.03 |
| 2015/0107813 A1 | 4/2015 | Omae et al. | |

FOREIGN PATENT DOCUMENTS

| | | |
|---|---|---|
| JP | 2004271143 A | 9/2004 |
| JP | 2009264664 A | 11/2009 |
| JP | 2011230655 A | 11/2011 |
| JP | 201372607 A | 4/2013 |
| JP | 2013-215736 A | 10/2013 |
| JP | 201455735 A | 3/2014 |
| WO | WO-2008041698 A1 | 4/2008 |

\* cited by examiner

HEAT EXCHANGER

CROSS REFERENCE TO RELATED APPLICATIONS

The present application is a continuation application of International Patent Application No. PCT/JP2018/022313 filed on Jun. 12, 2018, which designated the U.S. and claims the benefit of priority from Japanese Patent Application No. 2017-116053 filed on Jun. 13, 2017. The entire disclosures of all of the above applications are incorporated herein by reference.

TECHNICAL FIELD

The present disclosure relates to a heat exchanger.

BACKGROUND

Conventionally, a heat exchanger includes two core portions including stacks of multiple tubes are aligned in series with respect to a flow direction of air that is an external fluid, and a header tank provided at an end of tubes in each core portion such that the header tanks of the respective core portions are separated from each other.

SUMMARY

According to at least one embodiment of the present disclosure, a heat exchanger is for heat exchange between a first fluid and a second fluid. The heat exchanger includes heat exchanging units arranged in series with respect to a flow direction of the first fluid. Each of the heat exchanging units includes: a core portion including a stack of tubes through which the second fluid flows; and a header tank connected to end portions of the tubes and configured to distribute or collect the second fluid to or from the tubes. The header tank includes a tube joint portion through which the tubes are inserted. The tubes are joined to the tube joint portion. The header tank includes a tank body portion defining an internal space of the tank in cooperation with the tube joint portion. The tube joint portions of the heat exchanging units integrally constitute one core plate. At least one of the heat exchanging units has a claw protruding from the tank body portion toward the core portion. The core plate has a hole to be fitted with the claw. The claw is fitted into the hole, and the tank body portion is fixed to the core plate.

DETAILED DESCRIPTION

Figure 1:
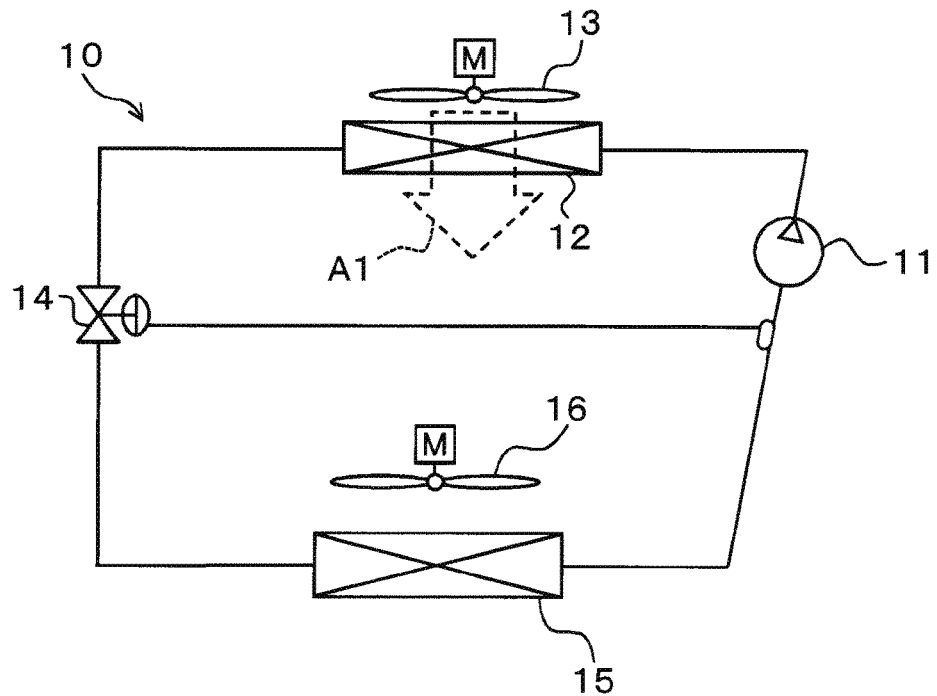
FIG. 1 is a whole configuration diagram of a refrigeration cycle device according to at least one embodiment.

A heat exchanger according to a comparative example includes two core portions including stacks of multiple tubes are aligned in series with respect to a flow direction of air that is an external fluid, and a header tank provided at an end of tubes in each core portion such that the header tanks of the respective core portions are separated from each other.

In the heat exchanger of the comparative example, each header tank includes a core plate having a tube insertion hole into which the end of the tube is inserted, and a tank body portion which defines an internal space of the tank in cooperation with the core plate. The core plate has a tube joining surface in which the tube insertion hole is provided, and two wall portions extending from opposite ends of the tube joining surface in a direction away from the core portion. At the time of assembling the tank body portion and the core plate, inner surfaces of the two wall portions of the core plate and an outer surface of the tank body portion are brought into contact with each other, thereby positioning the tank body portion and the core plate.

Further, in the heat exchanger of the comparative example, protrusion portions are provided on facing surfaces of the upstream and downstream core plates in the air flow. Then, at the time of assembling both the core plates, the positions of the core plates are fixed by bringing end surfaces of the protrusion portions of both the core plates into contact with each other. This allows the tube to be held at an assembled position.

However, in the heat exchanger of the comparative example, since the protrusion portions are provided between the core plates, there is a concern that the heat exchanger may be increased in size.

According to one aspect of the present disclosure, a heat exchanger is for heat exchange between a first fluid and a second fluid. The heat exchanger includes heat exchanging units arranged in series with respect to a flow direction of the first fluid. Each of the heat exchanging units includes: a core portion including a stack of tubes through which the second fluid flows; and a header tank connected to end portions of the tubes and configured to distribute or collect the second fluid to or from the tubes. The header tank includes a tube joint portion through which the tubes are inserted. The tubes are joined to the tube joint portion. The header tank includes a tank body portion defining an internal space of the tank in cooperation with the tube joint portion. The tube joint portions of the heat exchanging units integrally constitute one core plate. At least one of the heat exchanging units has a claw protruding from the tank body portion toward the core portion. The core plate has a hole to be fitted with the claw. The claw is fitted into the hole, and the tank body portion is fixed to the core plate.

According to the above configuration, the tank body portion is fixed to the core plate in a state in which the claw of the tank body portion is fitted into the hole of the core plate, thereby being capable of accurately positioning the tank body portion at a desired position in the core plate. At this time, since there is no need to separately provide a structure for positioning the tank body portion on the core plate, the heat exchanger can be reduced in size.

According to another aspect of the present disclosure, a heat exchanger is for heat exchange between a first fluid and a second fluid. The heat exchanger includes two heat exchanging units arranged in series with respect to a flow direction of the first fluid. Each of the two heat exchange units includes: a core portion including a stack of tubes through which the second fluid flows; and a header tank connected to end portions of the plurality of tubes and configured to distribute or collect the second fluid to or from the plurality of tubes. The header tanks of the two heat exchange units integrally constitute a single plate member. Each of opposite end portions of the plate member in the flow direction of the first fluid has a claw. A center portion of the plate member in the flow direction of the first fluid has a hole fitted to the claw. The claw is fitted into the hole by bending of the plate member inward from the opposite end portions in the flow direction of the first fluid such that the header tanks of the two exchange units are created.

According to the above configuration, the header tanks of the two heat exchanging units can be formed by bending one plate member so that the claws of the opposite end portions of the plate member are fitted into the holes. Since there is no need to separately provide a structure for positioning the two header tanks, the heat exchanger can be reduced in size.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A refrigeration cycle device 10 shown in FIG. 1 is applied to a vehicle air conditioner, and functions to cool an air blown into a vehicle compartment, which is a space to be cooled. The air blown into the vehicle compartment is a fluid to be cooled by the refrigeration cycle device 10.

The refrigeration cycle device 10 employs a fluorocarbon refrigerant (specifically, R1234yf) as a refrigerant, and configures a subcritical refrigeration cycle in which a high-pressure side refrigerant pressure does not exceed a critical pressure of the refrigerant. Further, a refrigerator oil for lubricating a compressor 11 is mixed in the refrigerant. Part of the refrigerator oil circulates in a cycle together with the refrigerant.

Among the components of the refrigeration cycle device 10, the compressor 11 suctions the refrigerant and compresses the refrigerant until the refrigerant becomes a high pressure refrigerant, and discharges the high-pressure refrigerant. More specifically, the compressor 11 according to the present embodiment is an engine-driven compressor driven by a rotational driving force transmitted from a vehicle travel engine through a pulley, a belt, or the like. As the engine-driven compressor, a variable capacity type compressor whose refrigerant discharge capacity can be adjusted by a change in discharge capacity, or a fixed capacity type compressor whose refrigerant discharge capacity can be adjusted by changing an operation rate of the compressor by interruption of an electromagnetic clutch can be adopted.

A refrigerant inlet side of a radiator 12 is connected to a discharge port of the compressor 11. The radiator 12 is a radiation heat exchanger that radiates and cools the high-pressure refrigerant by exchanging a heat between the high-pressure side refrigerant discharged from the compressor 11 and a vehicle exterior air (that is, an outside air) blown from a cooling fan 13.

The radiator 12 is a condenser that exchanges the heat between the high-pressure gas phase refrigerant discharged from the compressor 11 and the outside air blown from the cooling fan 13, radiates the heat from the high-pressure gas phase refrigerant, and condenses the high-pressure gas-phase refrigerant. The outside air of the present embodiment corresponds to a first fluid of the present disclosure, and the refrigerant of the present embodiment corresponds to a second fluid of the present disclosure.

The cooling fan 13 is an electric blower whose rotational speed (that is, blown air amount) is controlled by a control voltage output from an air-conditioning control device.

An inlet side of a temperature type expansion valve 14 is connected to a refrigerant outlet of the radiator 12. The temperature type expansion valve 14 is a refrigerant flow rate adjustment mechanism for reducing a pressure of the refrigerant that has flowed out of the radiator 12 and adjusting a circulating refrigerant flow rate of the refrigerant circulating in the cycle. The temperature type expansion valve 14 according to the present embodiment adjusts the flow rate of the circulating refrigerant so that the degree of superheat of the refrigerant on an outlet side of an evaporator 15 approaches a predetermined reference degree of superheat.

The temperature type expansion valve 14 includes a temperature sensing unit having a displacement member (that is, a diaphragm) which is displaced in accordance with the temperature and pressure of the refrigerant that has flowed out of the evaporator 15, and may employ a mechanical mechanism for adjusting the degree of valve opening so that the degree of superheat of the refrigerant on the outlet side of the evaporator 15 approaches a reference degree of superheat in accordance with the displacement of the displacement member.

The evaporator 15 is connected to an outlet of the temperature type expansion valve 14. The evaporator 15 is a heat-absorbing heat exchanger that cools the air by exchanging the heat between the air blown from a blower fan 16 toward the vehicle compartment and the low-pressure refrigerant flowing out from the temperature type expansion valve 14, and by evaporating the low-pressure refrigerant to exert a heat absorbing action.

The blower fan 16 is an electric blower whose rotational speed (that is, blown air amount) is controlled by a control voltage output from an air-conditioning control device. An intake port side of the compressor 11 is connected to a refrigerant outlet of the evaporator 15.

The evaporator 15 and the blower fan 16 are disposed in an interior air conditioning unit case (not shown) of the vehicle air conditioner.

Figure 2:
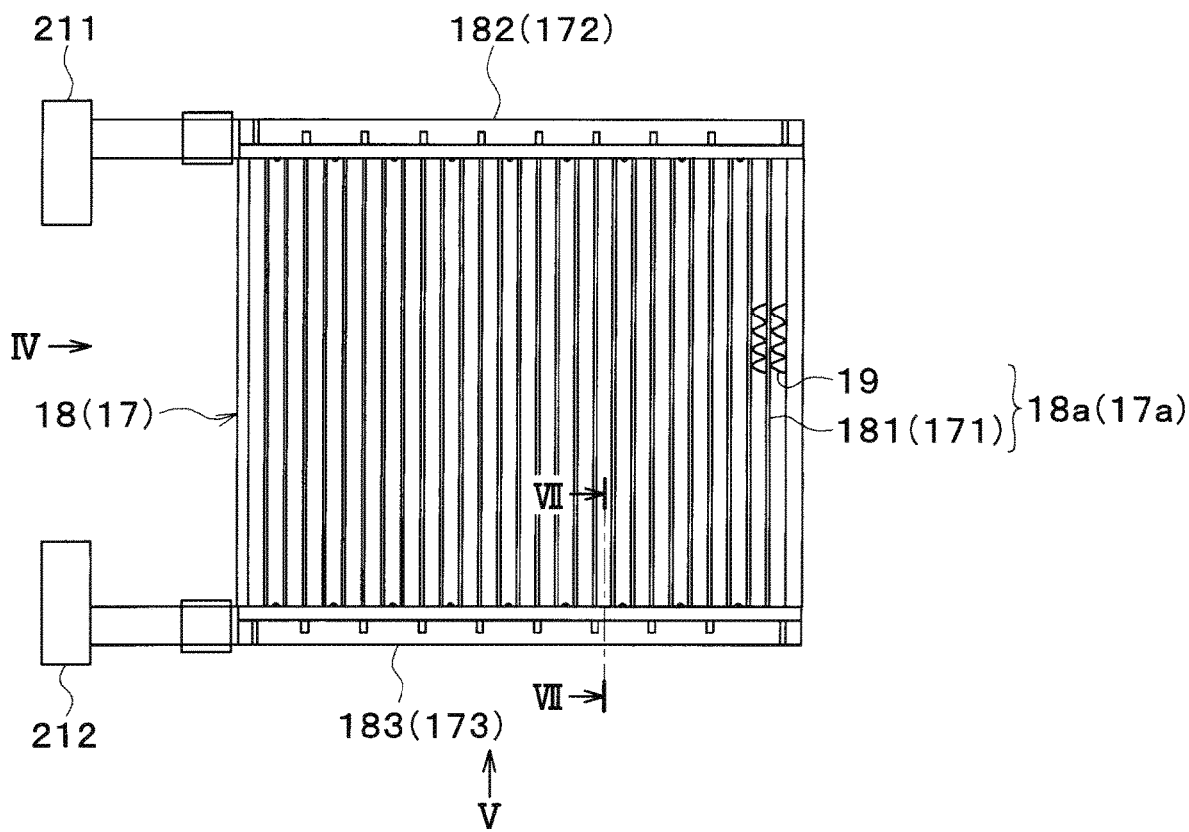
FIG. 2 is a front view showing a radiator according to at least one embodiment.

As shown in FIG. 2, the radiator 12 has a windward radiator 17 and a leeward radiator 18 as multiple heat exchanging units. The windward radiator 17 and the leeward radiator 18 are each configured by a so-called tank-and-tube type heat exchanger. The basic configurations of the windward radiator 17 and the leeward radiator 18 are the same as each other.

The windward radiator 17 has multiple windward tubes 171, a windward upper tank 172, and a windward lower tank 173. In FIG. 2, for convenience of illustration, the windward tubes 171, the windward upper tank 172, and the windward lower tank 173 are denoted by parentheses for leeward tubes 181, a leeward upper tank 182, and a leeward lower tank 183 of the leeward radiator 18.

The multiple windward tubes 171 are tubular members through which the refrigerant flows. The windward upper tank 172 is connected to one ends of the multiple windward tubes 171. The windward upper tank 172 is a header tank that distributes and collects the refrigerant with respect to the multiple windward tubes 171.

The windward lower tank 173 is connected to the other end portions of the multiple windward tubes 171. The windward lower tank 173 is a header tank that distributes and collects the refrigerant with respect to the multiple windward tubes 171.

The windward tube 171 is made of a metal having excellent heat conductivity (for example, an aluminum alloy). The windward tubes 171 are each formed of a flat tube having a flat cross-sectional shape perpendicular to a longitudinal direction of the windward tube.

Figure 16:
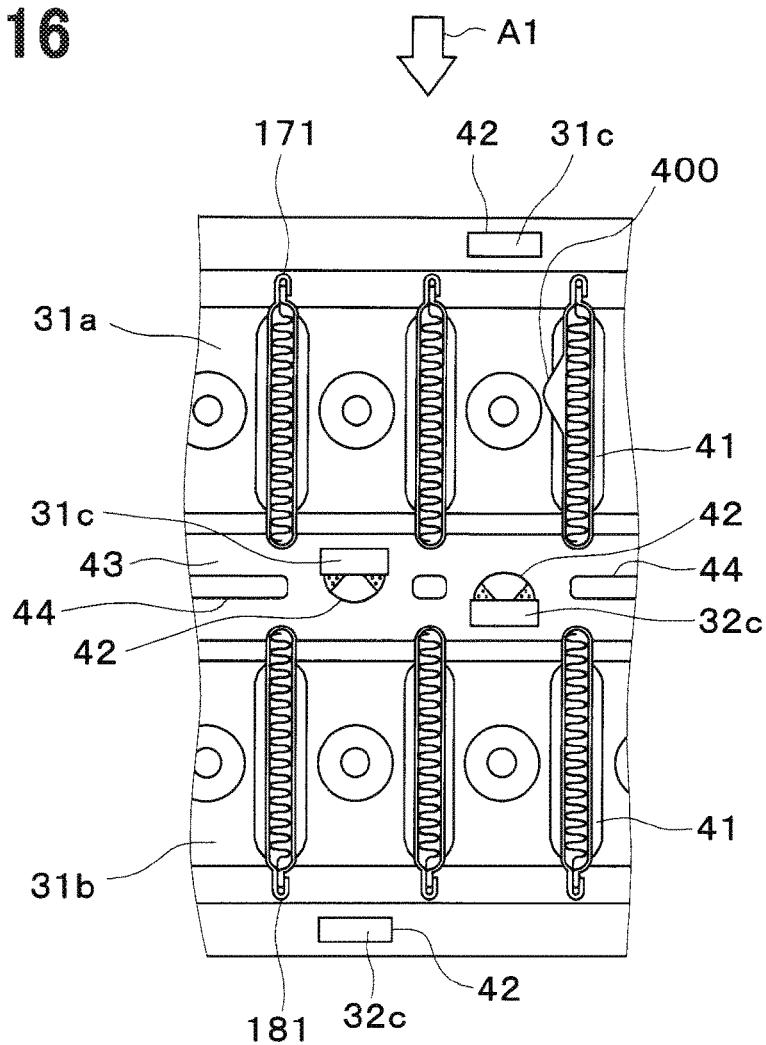
FIG. 16 is a schematic cross-sectional view showing the periphery of the core plate at the time of joint inspection of the radiator in at least one embodiment.

The windward tubes 171 according to the present embodiment are formed by bending a single flat plate. The flat plate is made of a metal having excellent heat conductivity (for example, an aluminum alloy). An inner fin 190 shown in FIG. 16 is provided inside the windward tube 171. The inner fin 190 is a corrugated fin formed by bending a thin plate material of the same material as that of the windward tube 171 into a wave shape. A top portion of the inner fin 190 is brazed to the inside of a flat surface of the windward tube 171.

The windward tubes 171 of the windward radiator 17 are stacked at predetermined intervals so that the flat surfaces (that is, flat surfaces) of the outer surfaces are parallel to each other. As a result, an air passage through which a blown air flows is provided between the adjacent windward tubes 171. In other words, in the windward radiator 17, the multiple windward tubes 171 are stacked over each other, thereby forming a heat exchanging unit for exchanging the heat between the refrigerant and the blown air.

Fins 19 are disposed in air passages provided between the adjacent windward tubes 171. The fins 19 are heat exchange promotion members for promoting the heat exchange between the refrigerant and the blown air.

Figure 3:
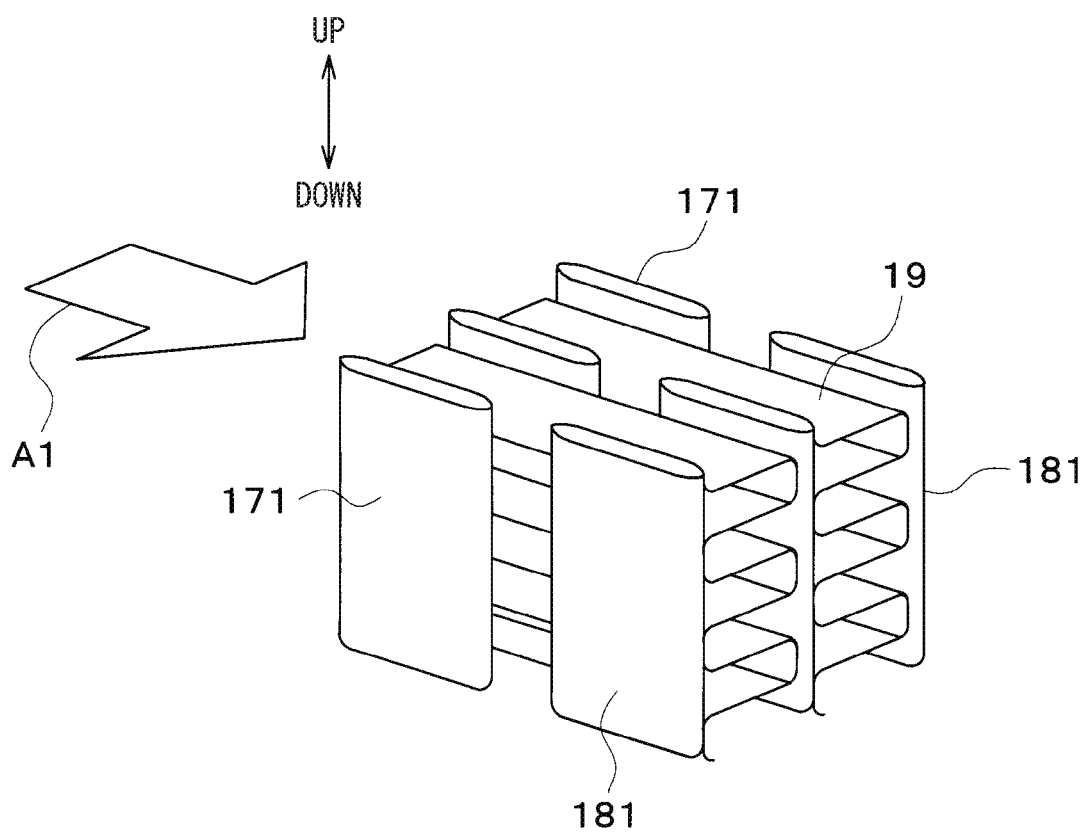
FIG. 3 is an enlarged perspective view of a heat exchanging unit in the radiator of FIG. 2.

As shown in FIG. 3, the fin 19 is a corrugated fin formed by bending a thin plate material made of the same material as that of the windward tube 171 into a wave shape. Top portions of the fin 19 are brazed to the outside of the flat surface of the windward tube 171.

In FIG. 2, the fins 19 are illustrated only in a part of the leeward radiator 18, but in the windward radiator 17, the fins 19 are arranged over substantially the entire area between adjacent windward tubes 171. Further, the fins 19 are arranged over substantially the entire area between the adjacent leeward tubes 181 in the leeward radiator 18. The windward tube 171 and the fin 19 configure a windward core portion 17a.

The windward upper tank 172 and the windward lower tank 173 of the windward radiator 17 are made of the same material as that of the windward tube 171, and are formed in a cylindrical shape. The windward upper tank 172 and the windward lower tank 173 are formed in a shape extending in a stacking direction of the windward tube 171.

A distribution space for distributing the refrigerant to each of the windward tubes 171 and a collection space for collecting the refrigerant that has flowed out of each of the windward tubes 171 are provided inside the windward upper tank 172 and the windward lower tank 173.

Like the windward radiator 17, the leeward radiator 18 has the multiple leeward tubes 181 through which the refrigerant flows, the leeward upper tank 182, and the leeward lower tank 183.

The leeward tube 181 employs the same flat tube as the windward tube 171. Fins 19 are disposed in air passages provided between the adjacent leeward tubes 181.

The leeward tube 181 and the fin 19 configure a leeward core portion 18a. The leeward core portion 18a exchanges the heat between the air passing through the windward core portion 17a and the refrigerant.

The leeward upper tank 182 is a header tank for distributing the refrigerant to the multiple leeward tubes 181. The leeward lower tank 183 is a header tank that collects the refrigerants from the multiple leeward tubes 181.

Figure 4:
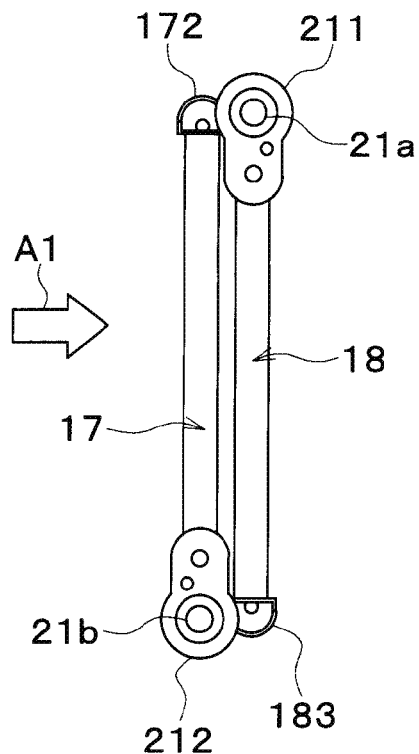
FIG. 4 is a view along an arrow IV of FIG. 2.

As shown in FIGS. 2 and 4, the radiator 12 has a first joint 211 and a second joint 212.

The first joint 211 is a connecting member provided with a refrigerant inflow port 21a. The refrigerant inflow port 21a is connected to a discharge port side of the compressor 11. The first joint 211 is brazed and joined to a side surface on one end side of the leeward upper tank 182. A refrigerant inflow passage (not shown) is provided inside the first joint 211. The refrigerant inflow passage is a refrigerant passage that guides the refrigerant from the refrigerant inflow port 21a into an internal space of the leeward upper tank 182.

The second joint 212 is a connecting member provided with a refrigerant outflow port 21b. The refrigerant outflow port 21b is connected to an inlet side of the temperature type expansion valve 14. The second joint 212 is brazed and joined to a side surface of one end side of the windward lower tank 173. A refrigerant outflow passage (not shown) is provided inside the second joint 212. The refrigerant outflow passage is a refrigerant passage for guiding the refrigerant from the windward lower tank 173 to the refrigerant outflow port 21b.

Figure 5:
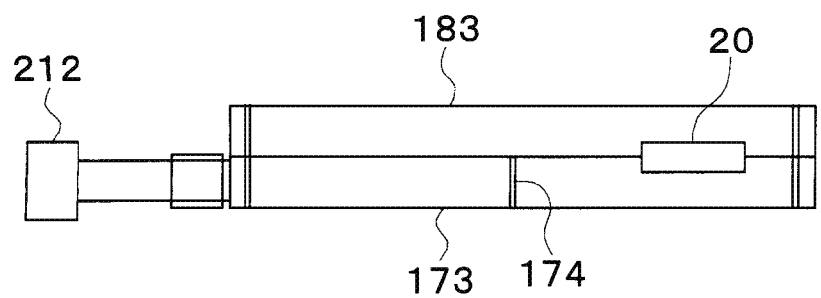
FIG. 5 is a view along an arrow V in FIG. 2.
Figure 6:
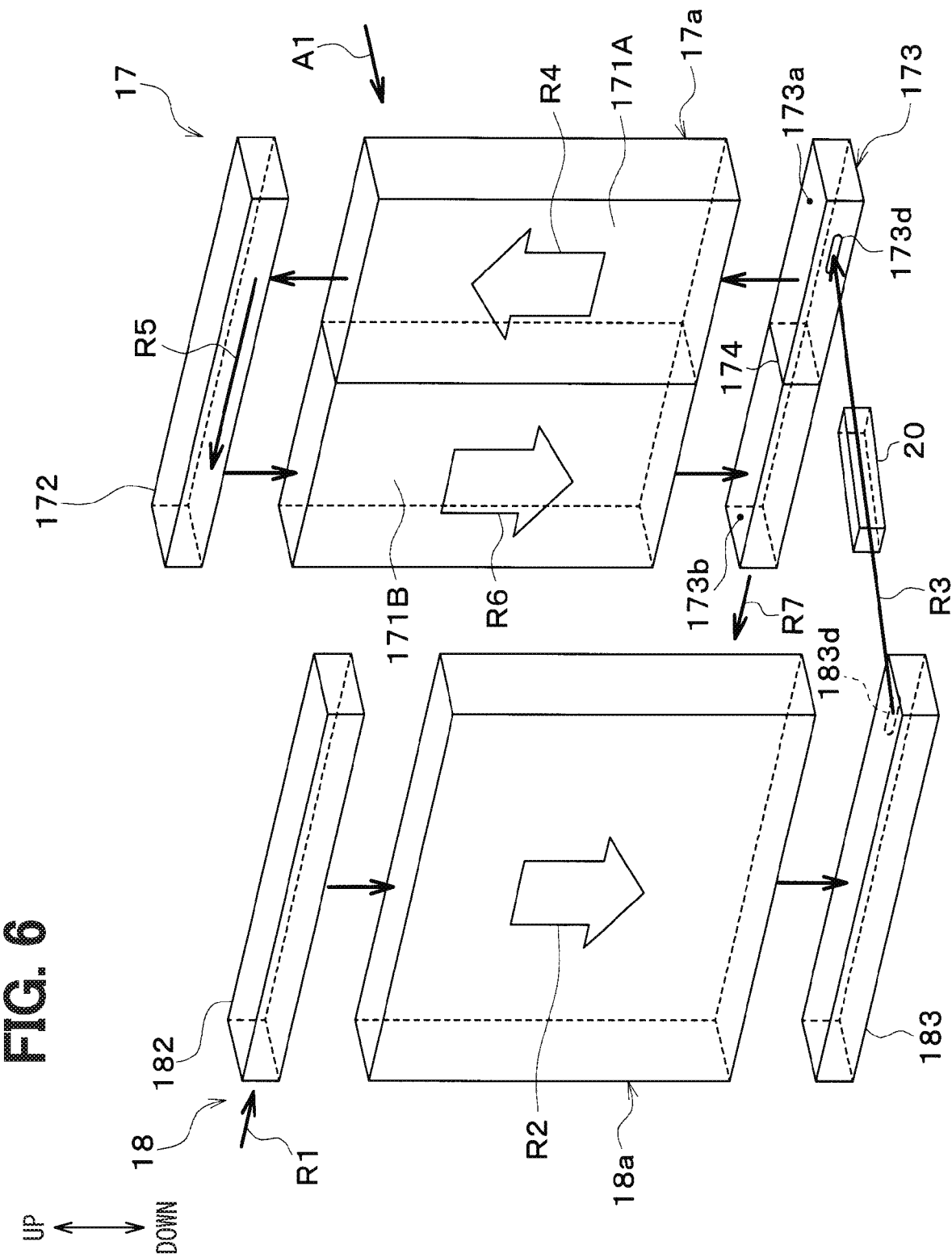
FIG. 6 is an illustrative view illustrating a refrigerant flow path in the radiator of FIG. 2.

As shown in FIGS. 5 and 6, a partition member 174 is disposed inside the windward lower tank 173. The partition member 174 is disposed at a substantially central portion in the stacking direction of the windward tube 171 in the interior of the windward lower tank 173.

The partition member 174 is a partition portion that partitions the windward lower tank 173 into two tanks in the stacking direction of the windward tube 171 (a left-right direction in FIGS. 5 and 6). The partition member 174 partitions the windward lower tank 173 into a distribution tank portion 173a and a collection tank portion 173b.

The distribution tank portion 173a distributes the refrigerant to a windward first tube group 171A among the multiple windward tubes 171. The collection tank portion 173b collects the refrigerant from a windward second tube group 171B among the multiple windward tubes 171. An internal space of the collection tank portion 173b communicates with the refrigerant outflow port 21b of the second joint 212.

As shown in FIG. 6, the windward upper tank 172 causes the refrigerant heat-exchanged by the windward first tube group 171A to flow into the windward second tube group 171B.

Figure 7:
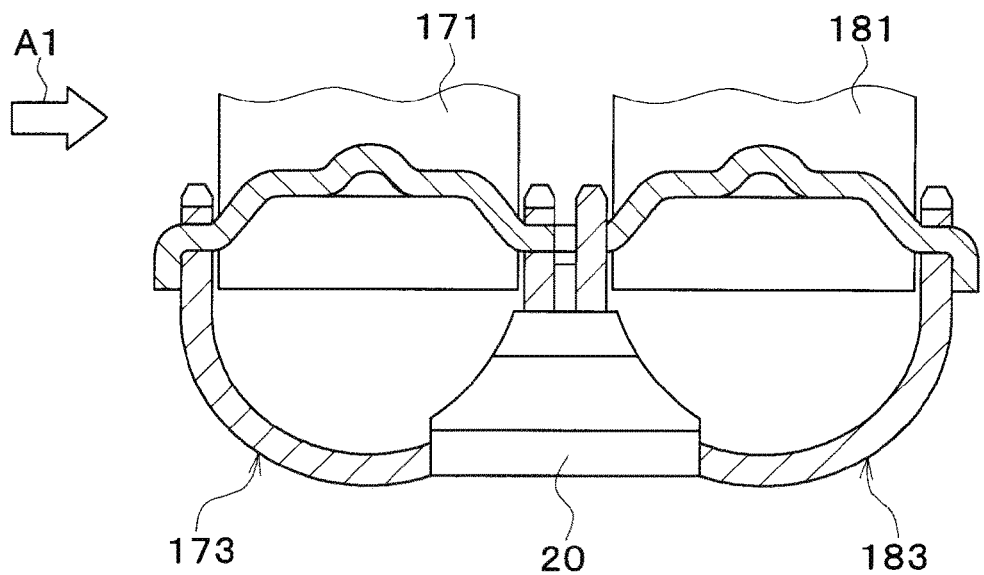
FIG. 7 is a cross-sectional view taken along a line VII-VII of FIG. 2.

As shown in FIGS. 5, 6, and 7, a communication member 20 in which a refrigerant flow channel is defined is provided between the windward lower tank 173 and the leeward lower tank 183. The communication member 20 is a communication passage for communicating the distribution tank portion 173a of the windward lower tank 173 with the leeward lower tank 183.

A leeward communication hole 183d is provided in the leeward lower tank 183. The leeward communication hole 183d communicates with one end portion of the communication member 20. As a result, the refrigerant in the leeward lower tank 183 flows into the communication member 20 through the leeward communication hole 183d.

A windward communication hole 173d is provided in the windward lower tank 173. The windward communication hole 173d communicates with the other end portion of the communication member 20. As a result, the refrigerant in the communication member 20 flows into the windward lower tank 173 through the windward communication hole 173d.

The windward radiator 17 and the leeward radiator 18 are integrated together by brazing and joining the windward tubes 171, the windward upper tank 172, the windward lower tank 173, the partition member 174, the leeward tubes 181, the leeward upper tank 182, the leeward lower tank 183, the fins 19, the communication member 20, the first joint 211, the second joint 212, and the like.

In this example, the refrigerant flow channel provided in the radiator 12 will be described with reference to FIG. 6. The refrigerant flowing in from the refrigerant inflow port 21a of the first joint 211 flows into the leeward upper tank 182 as indicated by an arrow R1 in FIG. 6.

The refrigerant that has flowed into the internal space of the leeward upper tank 182 flows through the leeward tube 181 of the leeward core portion 18a from the upper side to the lower side and flows into the leeward lower tank 183, as indicated by an arrow R2. The refrigerant that has flowed into the leeward lower tank 183 flows through the communication member 20 as indicated by an arrow R3, and flows into the distribution tank portion 173a of the windward lower tank 173.

The refrigerant flowing into the distribution tank portion 173a of the windward lower tank 173 flows from the lower side to the upper side in the windward first tube group 171A and flows into the windward upper tank 172, as indicated by an arrow R4. The refrigerant that has flowed into the windward upper tank 172 flows from one end side to the other end side in the longitudinal direction of the windward upper tank 172, and flows into the windward second tube group 171B, as indicated by an arrow R5.

The refrigerant flowing into the windward second tube group 171B flows from the upper side to the lower side in the windward second tube group 171B and flows into the collection tank portion 173b of the windward lower tank 173, as indicated by an arrow R6. The refrigerant that has flowed into the collection tank portion 173b flows out from the refrigerant outflow port 21b as indicated by an arrow R7.

Next, the detailed configurations of the windward upper tank 172, the windward lower tank 173, the leeward upper tank 182, and the leeward lower tank 183 according to the present embodiment will be described.

Since the windward upper tank 172 and the windward lower tank 173 have the same configuration, in the following description, the windward upper tank 172 and the windward lower tank 173 are collectively referred to as a windward tank 31. Since the leeward upper tank 182 and the leeward lower tank 183 have the same configuration, in the following description, the leeward upper tank 182 and the leeward lower tank 183 are collectively referred to as a leeward tank 32.

Figure 8:
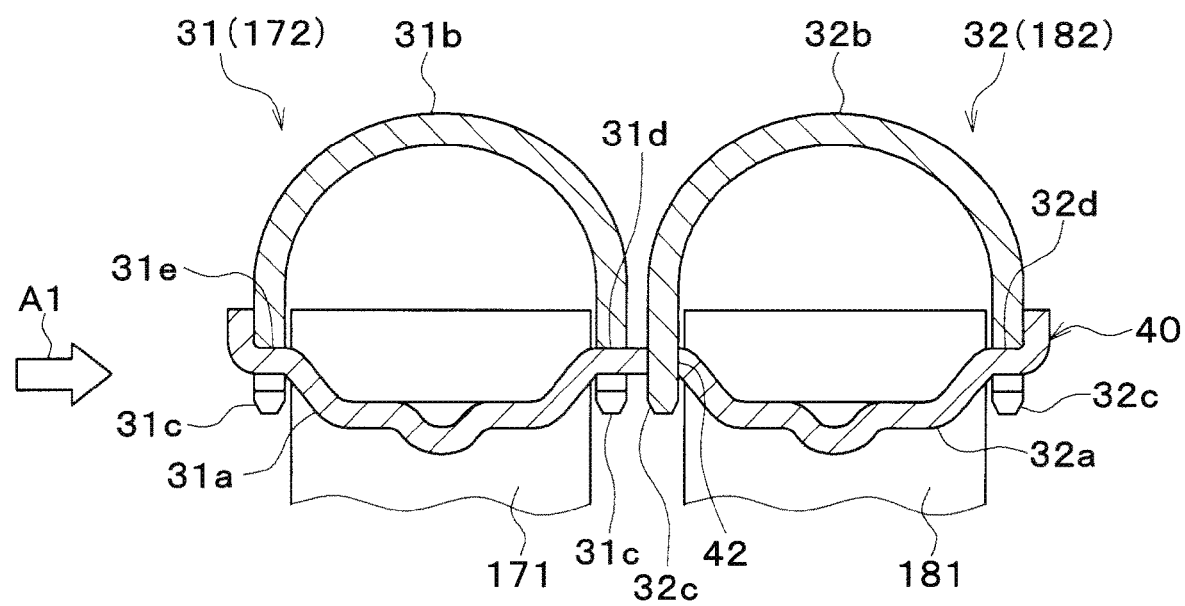
FIG. 8 is a cross-sectional view showing the periphery of a windward tank and a leeward tank in the radiator of FIG. 2.

As shown in FIG. 8, the windward tank 31 has a windward tube joint portion 31a to which the multiple windward tubes 171 are joined in an inserted state, and a windward tank body portion 31b which configures an internal space of the tank together with the windward tube joint portion 31a. The leeward tank 32 has a leeward tube joint portion 32a to which the multiple leeward tubes 181 are joined in an inserted state, and a leeward tank body portion 32b which configures an internal space of the tank together with the leeward tube joint portion 32a.

The windward tube joint portion 31a and the leeward tube joint portion 32a are integrally formed by one core plate 40. In other words, the core plate 40 has a windward tube joint portion 31a and a leeward tube joint portion 32a.

The windward tank body portion 31b and the leeward tank body portion 32b are formed in a substantially U-shaped cross section when viewed from the stacking direction of the respective tubes 171 and 181.

Figure 9:
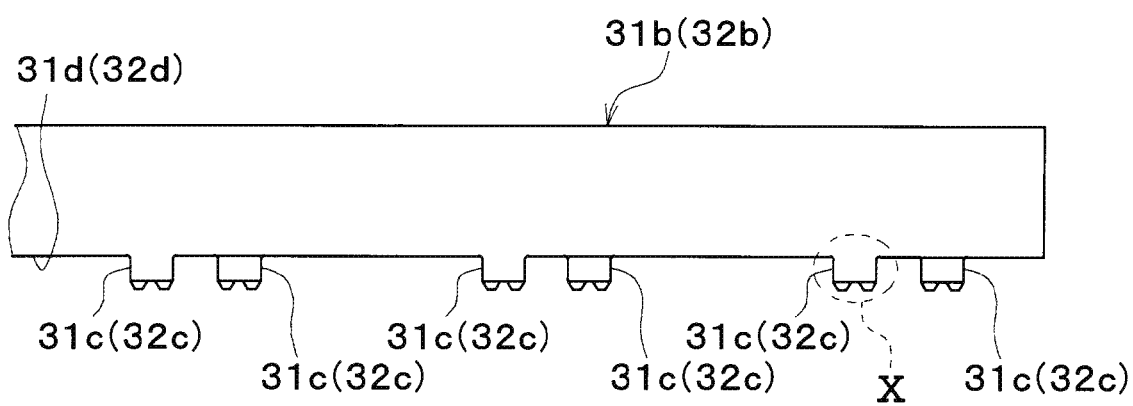
FIG. 9 is an enlarged front view showing a windward tank body portion according to at least one embodiment.

As shown in FIGS. 8 and 9, the windward tank body portion 31b has windward claws 31c protruding toward the core plate 40 (that is, toward the windward core portion 17a). The leeward tank body portion 32b has leeward claws 32c protruding toward the core plate 40 (that is, toward the leeward core portion 18a). However, both the windward tank body portion 31b and the leeward tank body portion 32b may not have the claws 31c and 32c, and at least one of the windward tank body portion 31b and the leeward tank body portion 32b may have a claw protruding toward the core plate 40.

Incidentally, in FIG. 9 and FIG. 10 to be described later, for convenience of illustration, the components such as the leeward claws 32c of the leeward tank body portion 32b are denoted by reference numerals with parentheses to the components such as the windward claws 31c of the windward tank body portion 31b.

In this example, the tip end surfaces of the windward tank body portion 31b and the leeward tank body portion 32b facing to the core plate 40, that is, the end surfaces in contact with the core plate 40 are referred to as tip end surfaces 31d, 31e, 32e, and 32d. Among the tip end surfaces 31d, 31e, 32e, and 32d, the tip end surfaces on the air flow upstream side of the tubes 171 and 181 are referred to as upstream tip end surfaces 31d and 32d, and the surfaces on the air flow downstream side on the tubes 171 and 181 are referred to as downstream tip end surfaces 31e and 32e.

Next, a detailed configuration of the claws (that is, the windward claws 31c and the leeward claws 32c) according to the present embodiment will be described. Since the leeward claws 32c has the same configuration as that of the windward claws 31c, the description of the leeward claws 32c and the like will be omitted.

The multiple windward claws 31c are provided on each of the upstream tip end surface 31d and the downstream tip end surface 31e of the windward tank body portion 31b. In the upstream tip end surface 31d and the downstream tip surface 31e, the multiple windward claws 31c are placed apart from each other.

Further, in the windward tank body portion 31b, the windward claw 31c formed on the upstream tip end surface 31d and the windward claw 31c formed on the downstream tip end surface 31e are placed at positions not overlapping with each other when viewed from the air flow direction A1. In other words, the windward claw 31c formed on the upstream tip end surface 31d and the windward claw 31c formed on the downstream tip end surface 31e are placed so as to be displaced from each other when viewed from the air flow direction A1.

Figure 10:
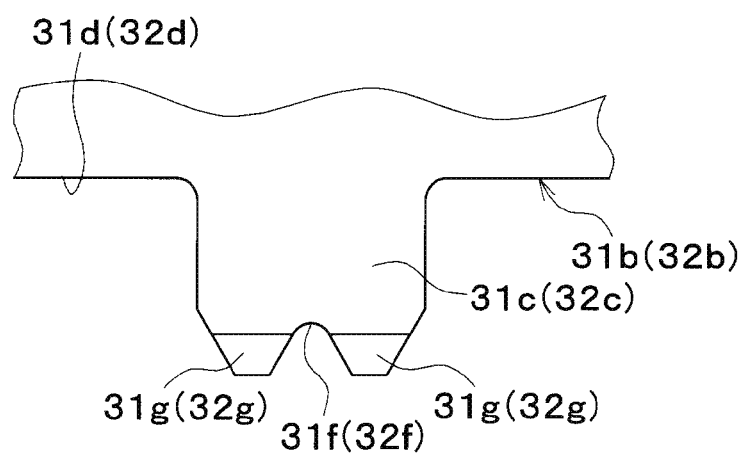
FIG. 10 is an enlarged view of a part X of FIG. 9.

As shown in FIG. 10, a groove 31f recessed in a direction away from the core plate 40 is provided at the tip portion of the windward claw 31c facing the core plate 40. The groove 31f is provided in the center portion in the stacking direction of the windward tube 171 among the tip portions of the windward claw 31c facing the core plate 40. The groove 31f divides the tip portion of the windward claw 31c facing the core plate 40 into two tip claws 31g.

Each of the tip claws 31g according to the present embodiment is formed in a truncated pyramid shape having a tapered surface on a side surface of the tip end claw 31g. In other words, the tip claws 31g according to the present embodiment are each formed into a quadrangular pyramid shape that is tapered from the tip end surfaces 31d and 31e toward the core plate 40.

An outer shape of a portion of the windward claw 31c excluding the tip claw 31g (hereinafter referred to as a root portion) is formed in a rectangular shape. In other words, the root portion of the windward claw 31c is formed to have a rectangular cross section when viewed from the longitudinal direction of the windward tube 171.

Figure 11:
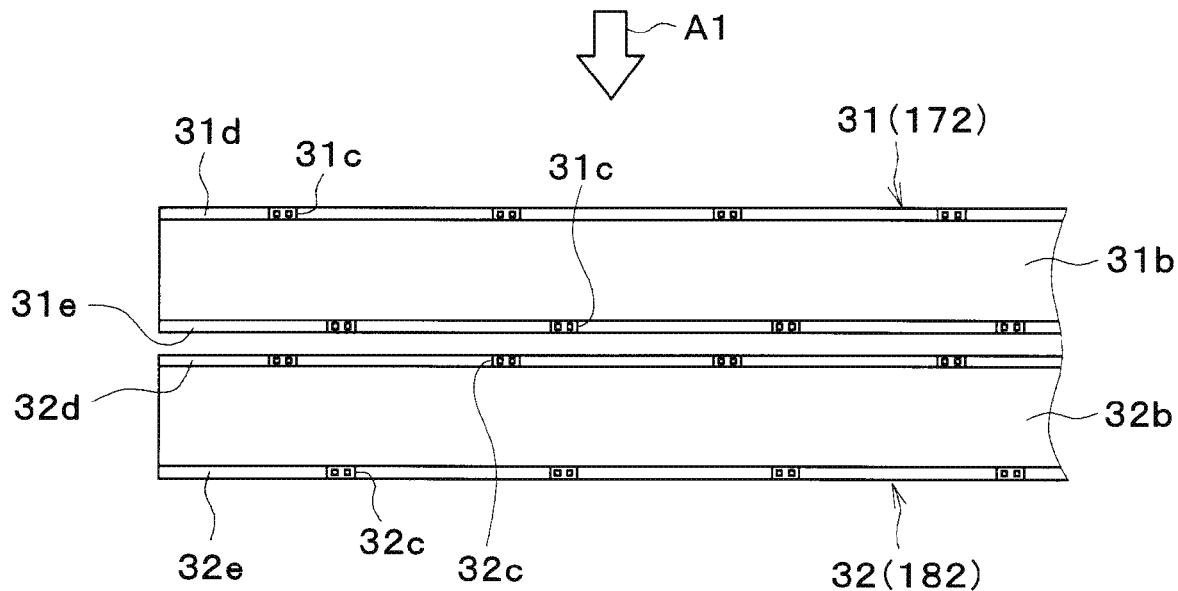
FIG. 11 is a plan view of the windward tank body portion and a leeward tank body portion according to the first embodiment as viewed from a core portion.

As shown in FIG. 11, the windward claw 31c provided on the downstream tip end surface 31e in the windward tank body portion 31b and the leeward claw 32c provided on the upstream tip end surface 32d in the leeward tank body portion 32b are placed at positions not overlapping with each other when viewed from the air flow direction A1. In other words, the windward claw 31c adjacent to the leeward tank body portion 32b in the windward tank body portion 31b and the leeward claw 32c adjacent to the windward tank body portion 31b in the leeward tank body portion 32b are placed at positions not overlapping with each other when viewed from the air flow direction A1. In other words, in the tank body portions 31b and 32b adjacent to each other in the air flow direction A1, the claw 31c of one tank body portion 31b adjacent to the other tank body portion 32b and the claw 32c of the other tank body portion 32b adjacent to the one tank body portion 31b are placed at positions not overlapping with each other when viewed from the air flow direction A1.

Figure 12:
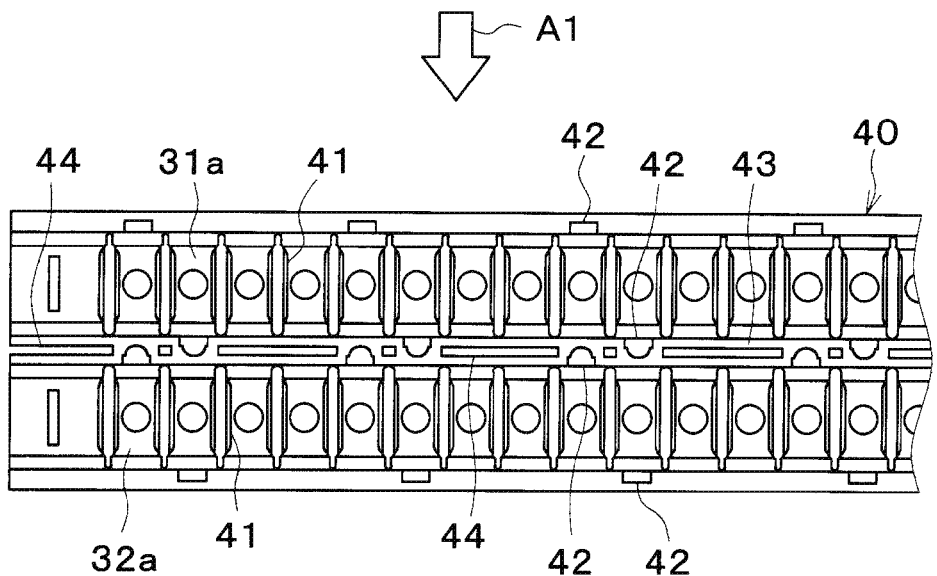
FIG. 12 is a plan view showing a core plate according to at least one embodiment.

As shown in FIG. 12, in the core plate 40, the leeward tube joint portion 32a and the windward tube joint portion 31a are placed in series to the air flow direction A1. Multiple tube insertion holes 41 into which end portions in the longitudinal direction of the tubes 171 and 181 are inserted are provided in the leeward tube joint portion 32a and the windward tube joint portion 31a, respectively.

The core plate 40 is provided with holes 42 into which the windward claw 31c and the leeward claw 32c are fitted. The windward tank body portion 31b and the leeward tank body portion 32b are fixed to the core plate 40 in a state in which the windward claw 31c and the leeward claw 32c are fitted into the respective holes 42.

More specifically, after the windward claw 31c and the leeward claw 32c have been fitted into the holes 42, the windward claw 31c and the leeward claw 32c are each split from the core portions 17a and 18a, whereby the windward claw 31c and the leeward claw 32c are fixed to the core plate 40 by crimping. According to the above configuration, the adhesiveness between the tank body portions 31b and 32b and the core plate 40 can be increased, and unbrazing between the tank body portions 31b and 32b and the core plate 40 can be inhibited.

Incidentally, the holes 42 are provided in the core plate 40 at a portion on the air flow upstream side of the windward tube joint portion 31a, at a portion on the air flow downstream side of the leeward tube joint portion 32a, and at a portion between the windward tube joint portion 31a and the leeward tube joint portion 32a. Hereinafter, a portion of the core plate 40 between the windward tube joint portion 31a and the leeward tube joint portion 32a is referred to as a boundary portion 43.

Slits 44 penetrating through the front and back of the core plate 40 is provided in the boundary portion 43. The multiple slits 44 are provided in a portion of the boundary portion 43 except for the holes 42. The slits 44 are provided to extend in the stacking direction of the tubes 171 and 181. The slits 44 may be provided between the windward radiator 17 and the leeward radiator 18 adjacent to each other. The slits 44 may be positioned between the holes 42 into which the windward claws 31c are fitted and the holes 42 into which the leeward claws 32 are fitted in the stacking direction of the tubes 171 and 181.

Figure 13:
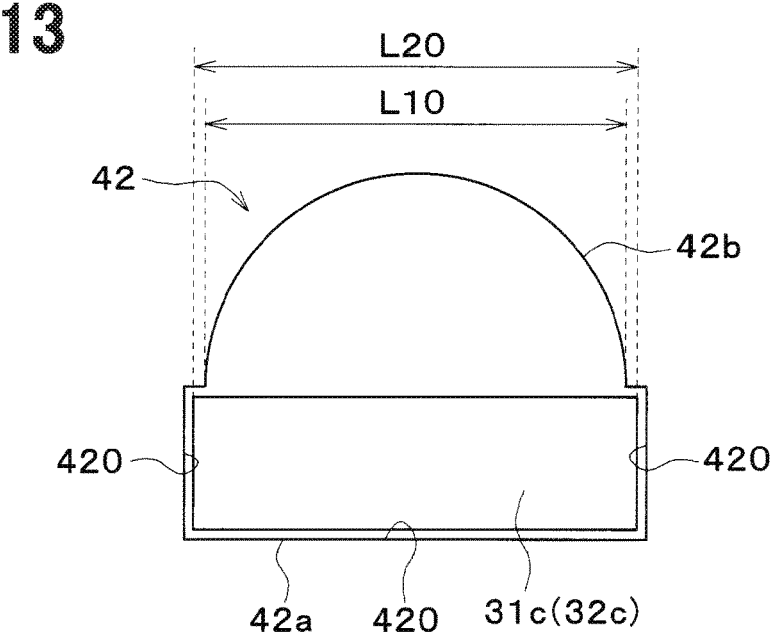
FIG. 13 is an enlarged plan view showing the periphery of a hole of the core plate according to at least one embodiment.

As shown in FIGS. 12 and 13, each hole 42 provided in the boundary portion 43 has a joint part 42a and a non-joint part 42b.

The joint part 42a has joint surfaces 420 to which the claws 31c and 32c are joined. Specifically, the joint part 42a is formed in a rectangular shape corresponding to an outer shape of the root portion of the claws 31c and 32c. The claws 31c and 32c are joined to three sides of the rectangular shape of the joint part 42a, which will be described later. In other words, three sides of the rectangular shape of the joint part 42a form the joint surfaces 420.

In this example, the three sides mentioned above are two sides extending in the air flow direction A1 in the rectangular shape of the joint part 42a and one side outside the air flow direction A1 in the boundary portion 43 among two sides extending in the stacking direction of the tubes 171 and 181. Therefore, in the rectangular shape of the joint part 42a, the claws 31c and 32c are not joined to one of the two sides extending in the stacking direction of the tubes 171 and 181 on the inner side of the boundary portion 43 in the air flow direction A1.

The non-joint part 42b does not have the joint surfaces 420. In other words, the claws 31c and 32c are not joined to the non-joint part 42b.

The non-joint part 42b is disposed on the inner side of the joint part 42a in the air flow direction A1 at the boundary portion 43. In other words, the non-joint part 42b is placed on the center side of the joint part 42a in the boundary portion 43 in the air flow direction A1. In other words, the non-joint part 42b is disposed on the center side (that is, the inner side) of the joint part 42a in the air flow direction A1 in the core plate 40.

The non-joint part 42b is formed in such a shape that a width of the non-joint part 42b in the stacking direction of the tubes 171 and 181 decreases in a direction away from the joint part 42a. In the present embodiment, the non-joint part 42b is formed in a semicircular shape.

A width L10 of the non-joint part 42b in the stacking direction of the tubes 171 and 181 at the end of the non-joint part 42b on the side of the joint part 42a is shorter than a width L20 of the claw 31c, 32c in the stacking direction of the tubes 171 and 181 at the end of the claws 31c and 32c on the side of the non-joint part 42b. As a result, when the claws 31c and 32c are inserted into the holes 42, the claws 31c and 32c are prevented from being deviated from the joint part 42a toward the non-joint part 42b.

Figure 14:
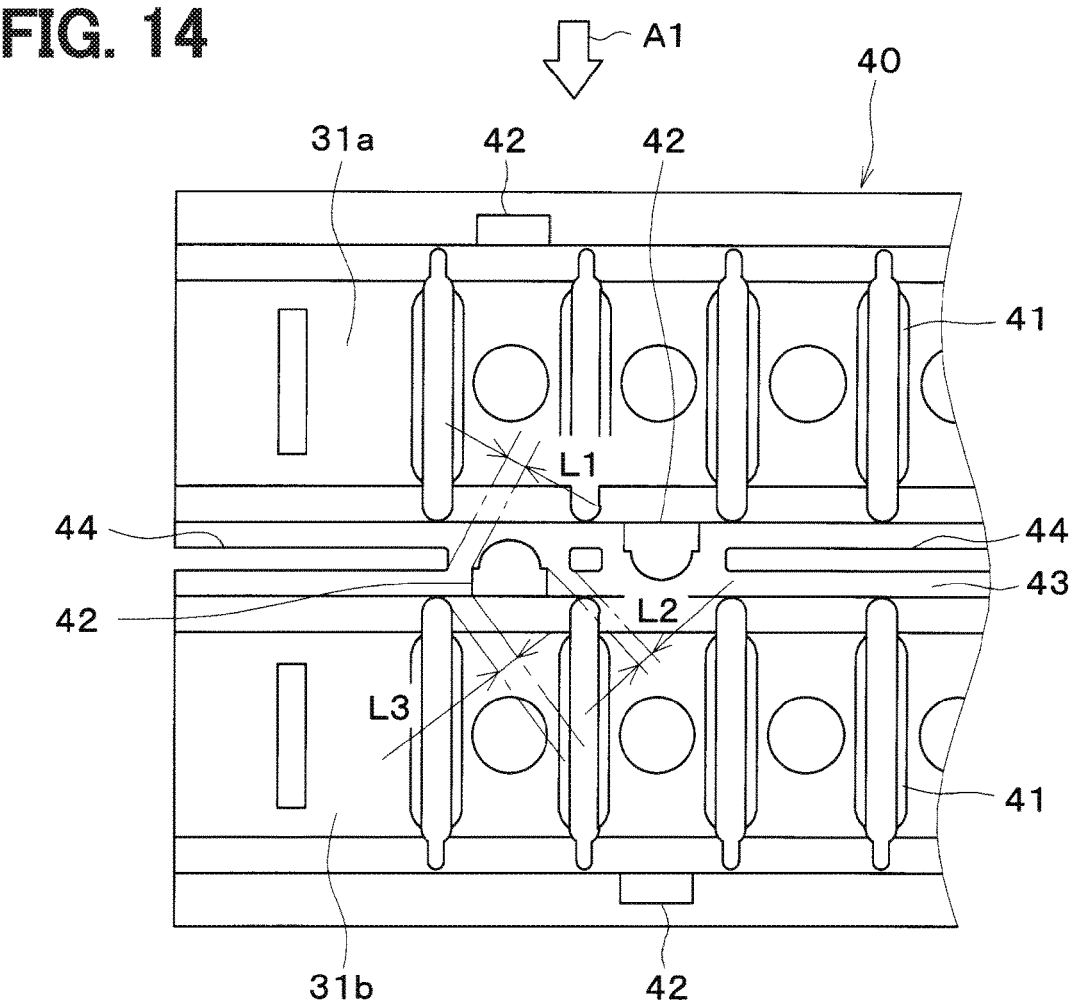
FIG. 14 is an enlarged view of a main part of the core plate in FIG. 12.

In this example, as shown in FIG. 14, in the core plate 40, the shortest distances between the holes 42 and the slits 44 are referred to as L1 and L2, and the shortest distance between the holes 42 and the tube insertion holes 41 is referred to as L3. In the present embodiment, the hole 42, the slits 44, and the tube insertion holes 41 are disposed so as to satisfy relationships of L1<L3 and L2<L3.

As described above, in the present embodiment, the claws 31c and 32c of the tank body portions 31b and 32b are fitted into the holes 42 of the core plate 40, thereby fixing the tank body portions 31b and 32b to the core plate 40. As a result, the tank body portions 31b and 32b can be accurately positioned at desired positions of the core plate 40. At that time, since there is no need to separately provide a structure for positioning the tank body portions 31b and 32b in the core plate 40, the radiator 12 can be reduced in size.

Figure 15:
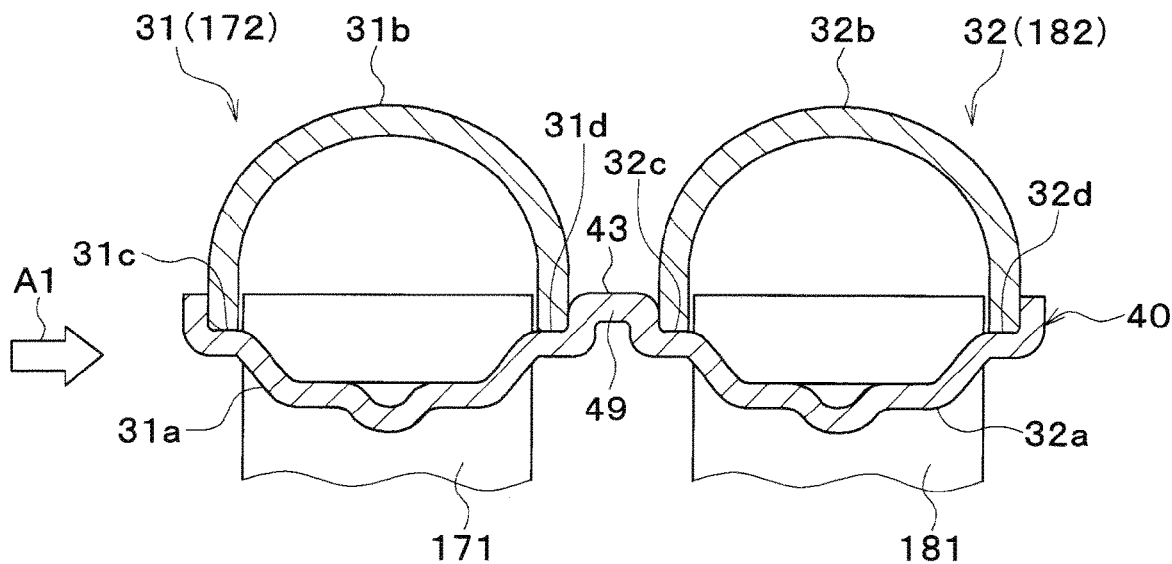
FIG. 15 is a cross-sectional view showing the periphery of a windward tank and a leeward tank in a heat radiator in a comparative example.

In this embodiment, as a comparative example, as shown in FIG. 15, a configuration is conceivable in which the claws 31c and 32c and the hole 42 are not provided in the radiator 12 in the present embodiment. In the configuration described above, in order to position the tank body portions 31b and 32b with respect to the core plate 40, a projection portion 49 protruding toward the opposite side of the core portions 17a and 18a is provided at the boundary portion 43 of the core plate 40. For that reason, the radiator is increased in size by a length of the projection portion 49 in the air flow direction A1.

On the other hand, in the present embodiment, since the tank body portions 31b and 32b are fixed to the core plate 40 in a state where the claws 31c and 32c are fitted into the holes 42 as described above, the projection portion 49 can be eliminated. This makes it possible to downsize the radiator 12.

In the present embodiment, the windward tube joint portion 31a and the leeward tube joint portion 32a are integrally formed by one core plate 40. For that reason, at the time of assembling the radiator 12, after all of the windward tube 171 and the leeward tube 181 are placed at predetermined intervals, the core plate 40 can be easily assembled to those tubes 171 and 181.

In the present embodiment, the windward tank body portion 31b and the leeward tank body portion 32b are configured separately. As a result, a heat transfer between the windward tank 31 and the leeward tank 32 can be inhibited. This makes it possible to inhibit the occurrence of a thermal harm in which the heat of one high-temperature refrigerant of the refrigerant in the windward tank 31 and the refrigerant in the leeward tank 32 is caused to heat the other low-temperature refrigerant.

In addition, in the present embodiment, the windward claw 31c provided on the downstream tip end surface 31e in the windward tank body portion 31b and the leeward claw 32c provided on the upstream tip end surface 32d in the leeward tank body portion 32b are placed at positions not overlapping with each other when viewed from the air flow direction A1. This makes it possible to shorten the length of the boundary portion 43 of the core plate 40 in the air flow direction A1. This makes it possible to further reduce the radiator 12 in size.

In the present embodiment, the slits 44 are provided in the boundary portion 43 of the core plate 40. According to the above configuration, since a heat transfer between the windward tank 31 and the leeward tank 32 can be inhibited, the thermal damage described above can be inhibited from occurring.

In the present embodiment, the holes 42 provided in the boundary portion 43 are provided with the joint part 42a and the non-joint part 42b. According to the above configuration, since the holes 42 and the claws 31c and 32c can be joined to each other at the joint part 42a, sealing property of the windward tank 31 and the leeward tank 32 can be ensured. Further, with the provision of the non-joint part 42b, the plate surface area of the boundary portion 43 can be reduced. As a result, since the heat transfer between the windward tank 31 and the leeward tank 32 can be inhibited, the occurrence of the thermal damage described above can be further inhibited.

In the present embodiment, the grooves 31f and 32f are provided at the tip portions of the claws 31c and 32c on the core plate 40 side. According to the above configuration, when the windward claw 31c and the leeward claw 32c are fixed to the core plate 40 in a swaging manner, the windward claw 31c and the leeward claw 32c can be easily split.

Further, in the present embodiment, the tip claws 31g and 32g of the claws 31c and 32c are each formed into a quadrangular pyramid. This makes it possible to improve the insertability of the claws 31c and 32c into the holes 42.

Further, in the present embodiment, as shown in FIG. 14, the holes 42, the slits 44, and the tube insertion holes 41 are disposed so as to satisfy a relationship of L1<L3 and L2<L3. According to the above configuration, when the claws 31c and 32c are fixed to the core plate 40 in the swaging manner, the L1 portion (that is, the portion where a distance between the holes 42 and the slits 44 is the shortest) is preferentially deformed, so that the tube insertion holes 41 can be inhibited from being deformed. For that reason, the brazing property can be improved.

Incidentally, the tubes 171 and 181 of the present embodiment are formed by bending one flat plate. As a joint inspection method of the tubes 171 and 181 formed in this manner, as shown in FIG. 16, there is a method of joining the tubes 171 and 181, the inner fins 190, the core plate 40, and the like together by integral brazing, and then expanding the unbrazed portion of the tubes 171 and 181 to visually inspect the expanded portion.

When such an inspection is performed, when the windward tube joint portion 31a and the leeward tube joint portion 32a are formed of different members, a positional deviation occurs between the windward tube 171 and the leeward tube 181, resulting in a possibility that an unbrazed portion may be erroneously detected.

On the other hand, in the present embodiment, since the windward tube joint portion 31a and the leeward tube joint portion 32a are integrally formed by one core plate 40, a positional deviation of the windward tube 171 and the leeward tube 181 can be inhibited. This makes it possible to inhibit the erroneous detection of unbrazed portions in the joint inspection of the tubes 171 and 181.

Second Embodiment

Next, a second embodiment of the present disclosure will be described with reference to FIG. 17. The present embodiment is different from the first embodiment in the configurations of a windward tank 31 and a leeward tank 32.

Figure 17:
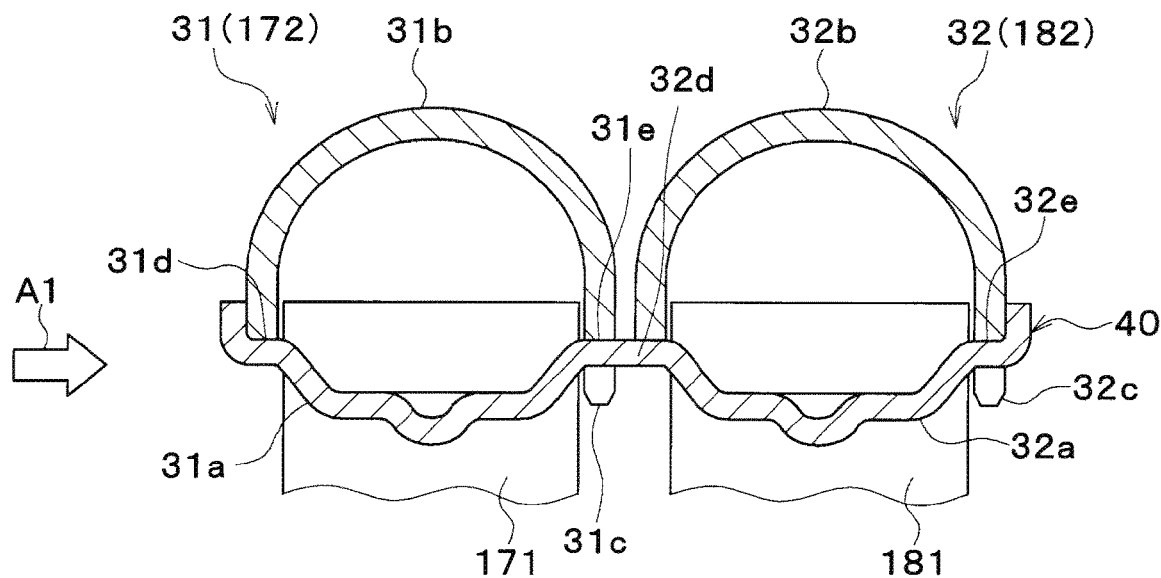
FIG. 17 is a cross-sectional view showing the periphery of a windward tank and a leeward tank in a radiator according to at least one embodiment.

As shown in FIG. 17, a windward claw 31c of a windward tank body portion 31b is provided on a downstream tip end surface 31e of an upstream tip end surface 31d and the downstream tip end surface 31e. In other words, the windward claw 31c is not provided on the upstream tip end surface 31d of the windward tank body portion 31b.

In the same manner, a leeward claw 32c of a leeward tank body portion 32b is provided on a downstream tip end surface 32e of an upstream tip end surface 32d and the downstream tip end surface 32e. In other words, the leeward claw 32c is not provided on the upstream tip end surface 32d of the leeward tank body portion 32b.

According to the present embodiment, a boundary portion 43 of a core plate 40 need not be provided with the hole 42 into which the leeward claw 32c is fitted, but need only be provided with the hole 42 into which the windward claw 31c is fitted. For that reason, since a length of the boundary portion 43 in the air flow direction A1 can be shortened, the radiator 12 can be surely reduced in size.

Third Embodiment

Figure 18:
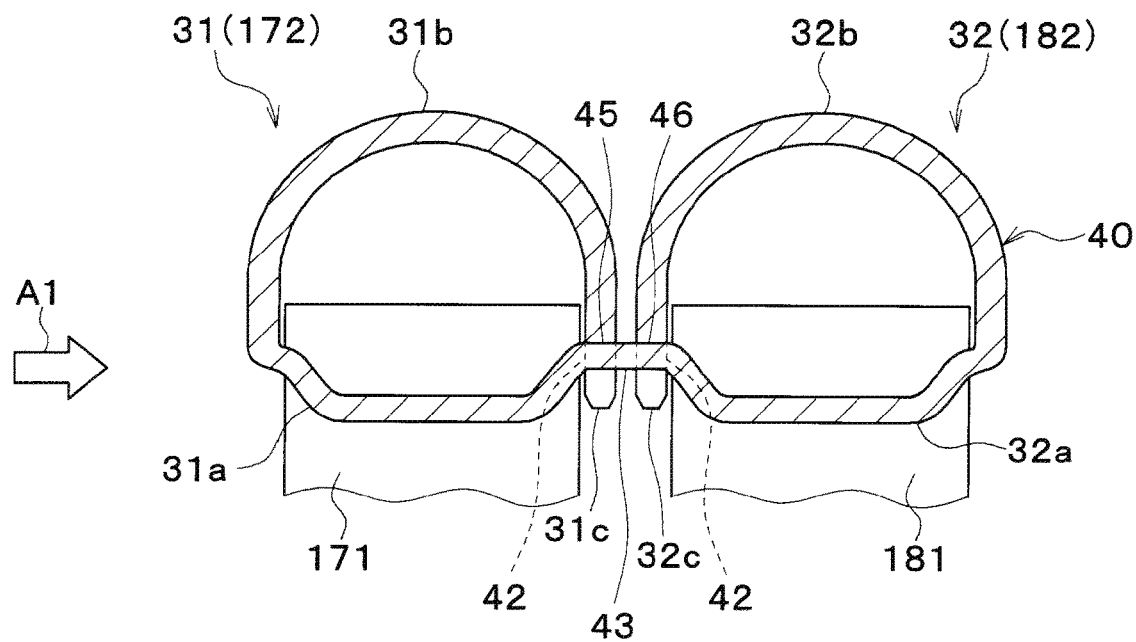
FIG. 18 is a cross-sectional view showing the periphery of a windward tank and a leeward tank in a radiator according to at least one embodiment.

Next, a third embodiment of the present disclosure will be described with reference to FIG. 18. The present embodiment is different from the first embodiment in the configurations of a windward tank 31 and a leeward tank 32. As shown in FIG. 18, a windward tank 31 and a leeward tank 32 are integrally formed by one core plate 40 which is a single plate member. In other words, a windward tube joint portion 31a, a windward tank body portion 31b, a leeward tube joint portion 32a, and a leeward tank body portion 32b are integrally formed by one core plate 40.

More specifically, an upstream end portion 45 of the core plate 40 in an air flow direction A1 is formed with a windward claw 31c. A downstream end portion 46 of the core plate 40 in the air flow direction A1 is formed with a leeward claw 32c. Holes 42 are provided in the core plate 40 on the substantially central side of the air flow direction A1 (that is, a boundary portion 43) so as to be fitted to the windward claw 31c or the leeward claw 32c.

Then, the core plate 40 is bent inward from both the end portions 45 and 46 in the air flow direction A1, and the windward claw 31c and the leeward claw 32c are fitted into the holes 42, to thereby form the windward tank 31 and the leeward tank 32. At that time, in the present embodiment, the windward tube joint portion 31a and the leeward tube joint portion 32a are formed in a substantially plate-like shape. In addition, the windward tank body portion 31b and the leeward tank body portion 32b are formed in an arc shape in which a cross section of the tubes 171 and 181 seen from the stacking direction protrudes toward the opposite side of the core portions 17a and 18a.

The other configuration of the radiator 12 is the same as that of the first embodiment. According to the present embodiment, the windward tank 31 and the leeward tank 32 can be formed by bending one core plate 40 so that the claws 31c and 32c at both ends of the core plate 40, which is a plate member, are fitted into the holes 42. At that time, since there is no need to separately provide a structure for positioning the windward tank 31 and the leeward tank 32, the radiator 12 can be reduced in size.

Further, in the present embodiment, since the windward tube joint portion 31a, the windward tank body portion 31b, the leeward tube joint portion 32a, and the leeward tank body portion 32b are formed by the core plate 40 which is one component, the number of components can be reduced.

Fourth Embodiment

Next, a fourth embodiment of the present disclosure will be described with reference to FIG. 19. The present embodiment is different from the third embodiment in the configurations of a windward tank 31 and a leeward tank 32.

Figure 19:
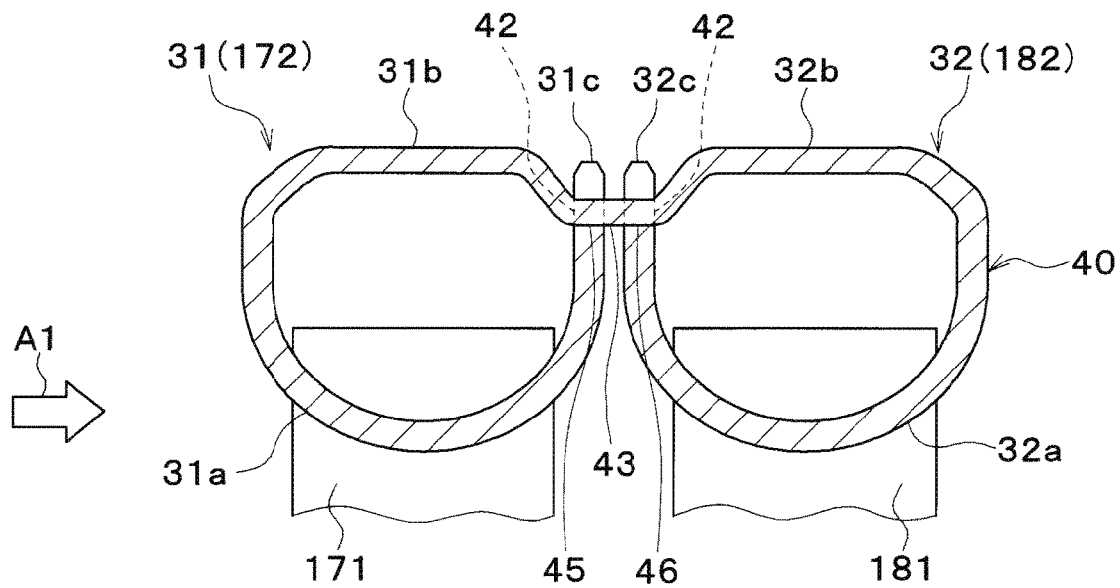
FIG. 19 is a cross-sectional view showing the periphery of a windward tank and a leeward tank in a radiator according to at least one embodiment.

As shown in FIG. 19, in the present embodiment, a windward tube joint portion 31a and a leeward tube joint portion 32a are formed in an arc shape in which a cross section of the tubes 171 and 181 seen from the stacking direction protrudes toward core portions 17a and 18a. The windward tank body portion 31b and the leeward tank body portion 32b are formed in a substantially plate-like shape.

The other configuration of the radiator 12 is the same as that of the third embodiment. Therefore, the same effects as those of the third embodiment can be obtained also in the radiator 12 of the present embodiment.

Fifth Embodiment

Figure 20:
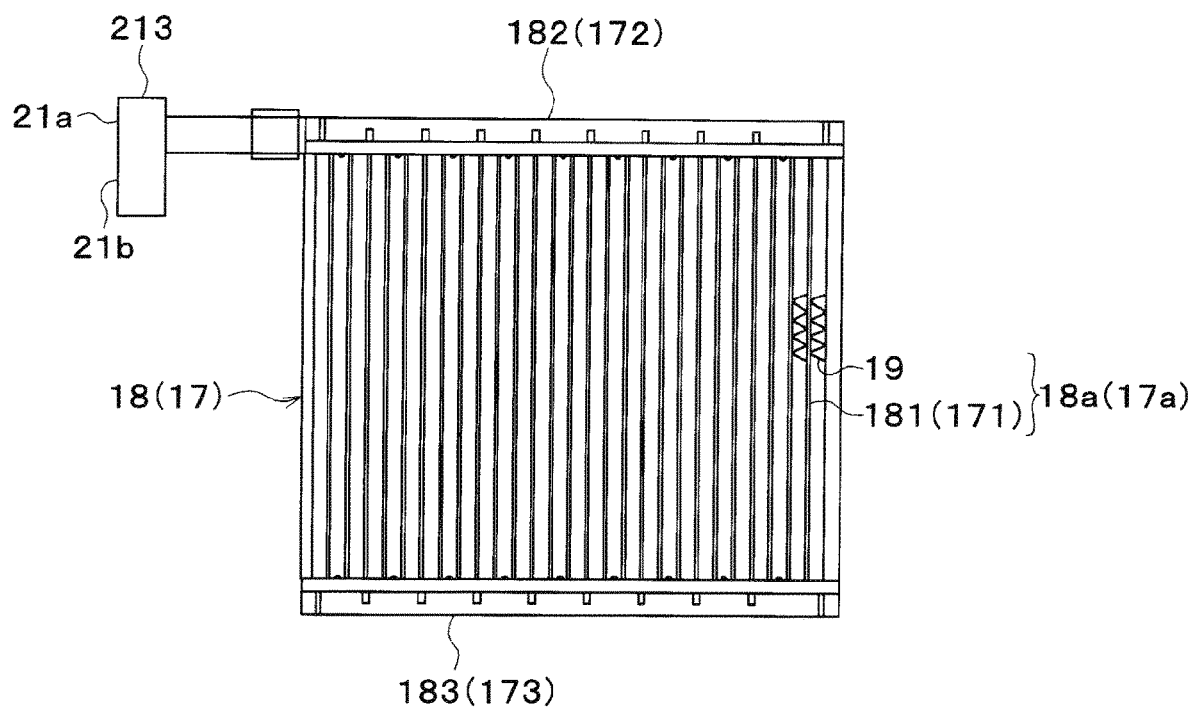
FIG. 20 is a front view showing a radiator according to at least one embodiment.

Next, a fifth embodiment of the present disclosure will be described with reference to FIGS. 20 and 21. The present embodiment differs from the first embodiment in a flow of a refrigerant in a radiator 12. In FIG. 20, for convenience of illustration, a windward tube 171, a windward upper tank 172, a windward lower tank 173, and a windward core portion 17a are denoted by parentheses for a leeward tube 181, a leeward upper tank 182, a leeward lower tank 183, and a leeward core portion 18a of the leeward radiator 18.

As shown in FIG. 20, a radiator 12 of the present embodiment has a joint 213. The joint 213 is a connecting member provided with a refrigerant inflow port 21a and a refrigerant outflow port 21b. The joint 213 is brazed and joined to a side surface on one end side of the leeward upper tank 182 and the windward upper tank 172.

A refrigerant inflow passage and a refrigerant outflow passage (not shown) are formed inside the joint 213. The refrigerant inflow passage is a refrigerant passage that guides the refrigerant from the refrigerant inflow port 21a into an internal space of the leeward upper tank 182. The refrigerant outflow passage is a refrigerant passage that guides the refrigerant from the windward upper tank 172 to the refrigerant outflow port 21b.

Figure 21:
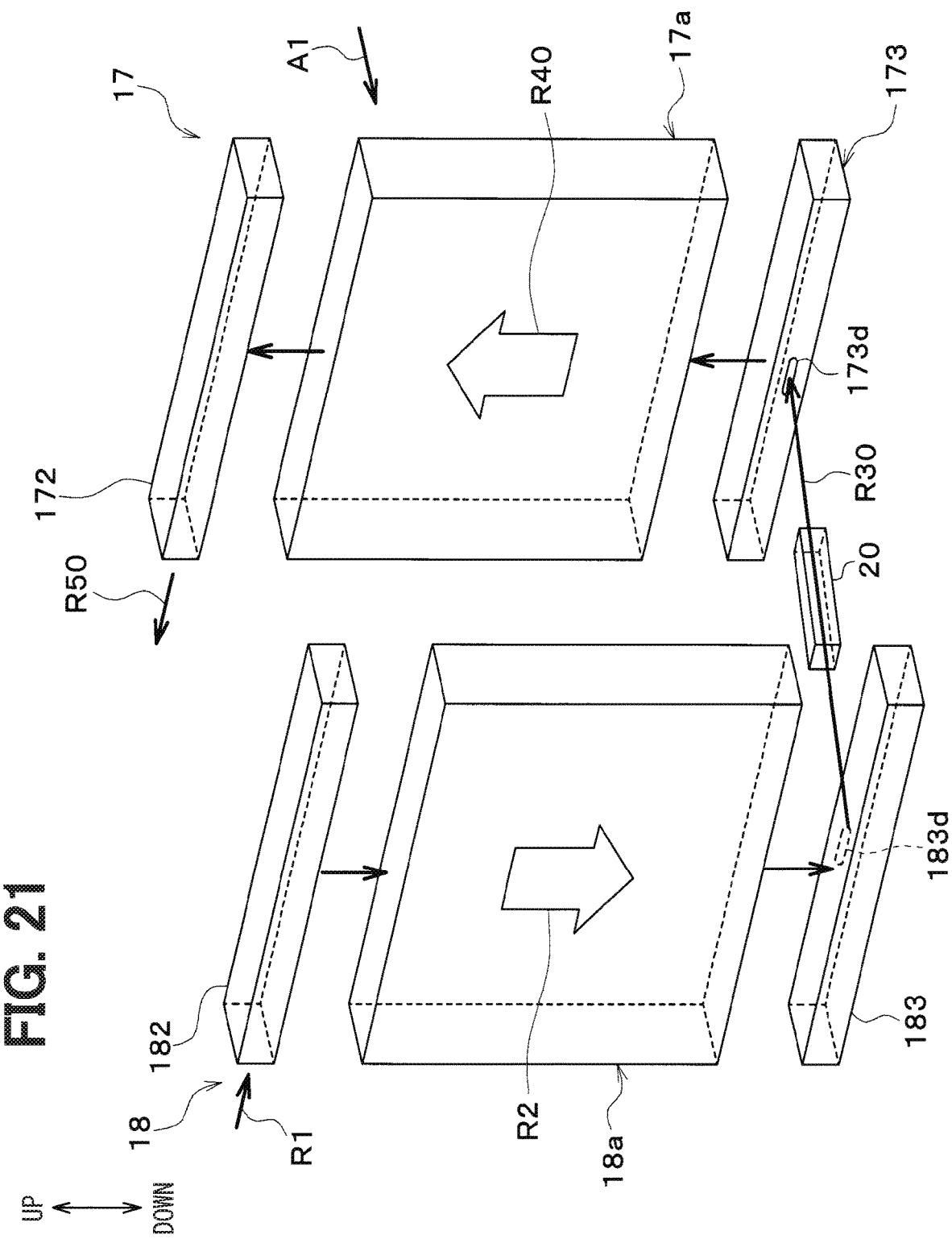
FIG. 21 is an illustrative view illustrating a refrigerant flow path in the radiator of FIG. 20.

As shown in FIG. 21, a partition member is not provided inside the windward lower tank 173 in the present embodiment. Further, a communication member 20 according to the present embodiment allows the windward lower tank 173 and the leeward lower tank 183 to communicate with each other.

Next, a refrigerant flow channel provided in the radiator 12 of the present embodiment will be described with reference to FIG. 20. The refrigerant that has flowed into the leeward lower tank 183 flows through the communication member 20 and flows into the windward lower tank 173, as indicated by an arrow R30 in FIG. 20.

The refrigerant flowing into the windward lower tank 173 flows from a lower side to an upper side through the windward tube 171 of the windward core portion 17a and flows into the windward upper tank 172, as indicated by an arrow R40. The refrigerant that has flowed into the windward upper tank 172 flows out from the refrigerant outflow port 21b as indicated by an arrow R50.

The other configuration of the radiator 12 is the same as that of the first embodiment. Therefore, the same effect as that of the first embodiment can be obtained also in the radiator 12 of the present embodiment.

The present disclosure is not limited to the embodiments described above, and various modifications can be made, for example, as described below, without departing from the spirit of the present disclosure. The means disclosed in each of the above embodiments may be appropriately combined to the extent practicable.

Figure 22:
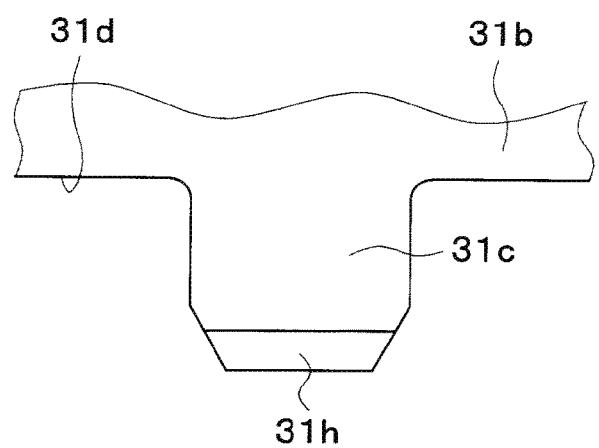
FIG. 22 is an enlarged front view showing the periphery of a windward claw in a radiator of at least one embodiment.

In the above embodiments, an example has been described in which the groove 31f recessed toward the opposite side of the core plate 40 is provided at the tip portion of the windward claw 31c on the core plate 40 side, but the shape of the windward claw 31c is not limited to this example. For example, as shown in FIG. 22, the groove 31f may not be provided in the windward claw 31c. In that case, the tip portion 31h of the windward claw 31c on the core plate 40 side may be formed in a truncated quadrangular pyramid shape having a tapered surface on the side surface. The same applies to the leeward claw 32c.

Figure 23:
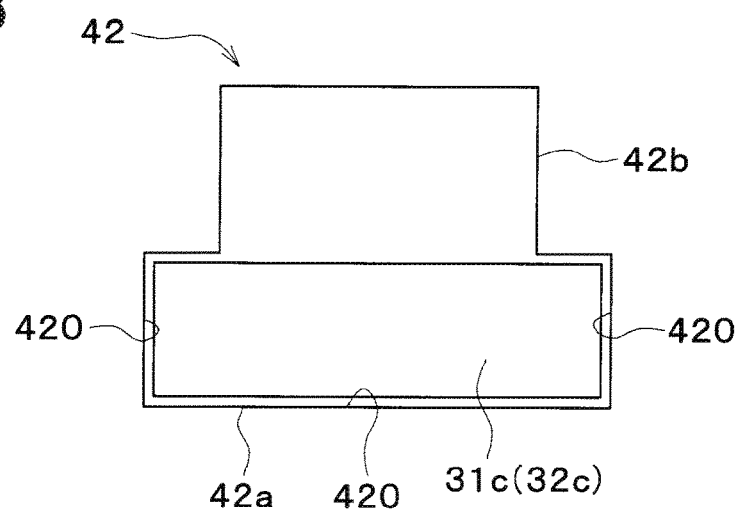
FIG. 23 is an enlarged plan view showing the periphery of a hole of a core plate in at least one embodiment.

In the above embodiments, an example in which the non-joint part 42b in the hole 42 provided in the boundary portion 43 of the core plate 40 is formed in a semicircular shape has been described, but the shape of the non-joint part 42b is not limited to the above example. For example, as shown in FIG. 23, the non-joint part 42b may be formed in a rectangular shape having an area smaller than that of the joint part 42a. In other words, the non-joint part 42b may be formed in a rectangular shape smaller than the cross-sectional area of the cross sections of the tubes 171 and 181 in the root portions of the claws 31c and 32c when viewed from the longitudinal direction.

Figure 24:
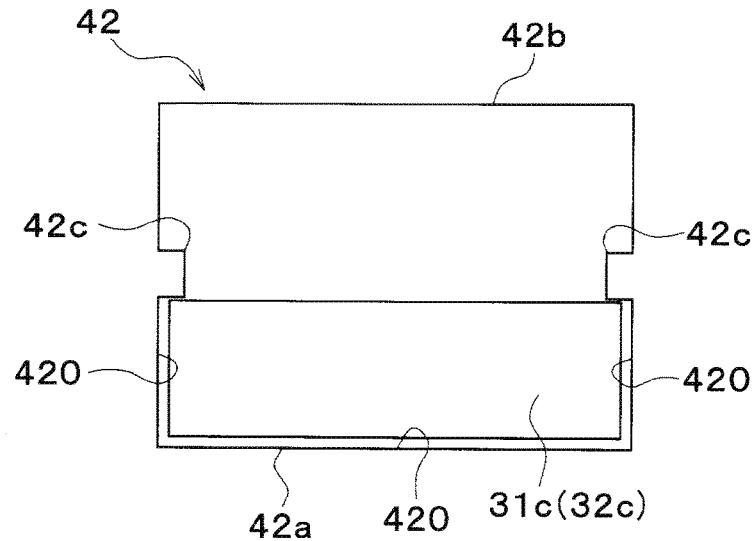
FIG. 24 is an enlarged plan view showing the periphery of the hole of the core plate in at least one embodiment.

Further, for example, as shown in FIG. 24, the non-joint part 42b may be formed in a rectangular shape, and at the end of the non-joint part 42b on the side of the joint part 42a, a protrusion portion 42c protruding toward the inner side of the non-joint part 42b (that is, the inner side in the stacking direction of the tubes 171 and 181) may be provided. In that case, the protrusion portion 42c may be formed integrally with the core plate 40.

In the above embodiments, an example in which the heat exchanger according to the present disclosure is applied to the radiator 12 of the refrigeration cycle device 10 has been described, but the application of the heat exchanger is not limited to the above example. For example, the heat exchanger according to the present disclosure may be applied to the evaporator 15 of the refrigeration cycle device 10, or may be applied to a radiator that cools the engine coolant water by the outside air.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A heat exchanger for heat exchange between a first fluid and a second fluid, the heat exchanger comprising
a plurality of heat exchanging units arranged in series with respect to a flow direction of the first fluid, wherein
each of the plurality of heat exchanging units includes:
a core portion including a stack of a plurality of tubes through which the second fluid flows; and
a header tank connected to end portions of the plurality of tubes and configured to distribute or collect the second fluid to or from the plurality of tubes,
the header tank includes:
a tube joint portion having tube insertion holes through which the plurality of tubes are inserted, the plurality of tubes being joined to the tube joint portion; and
a tank body portion defining an internal space of the tank in cooperation with the tube joint portion,
the tube joint portions of the plurality of heat exchanging units integrally constitute one core plate,
at least two of the plurality of heat exchanging units have a claw protruding from the tank body portion toward the core portion,
the core plate has a claw hole to be fitted with the claw,
the claw is fitted into the claw hole, and the tank body portion is fixed to the core plate,
the tank body portions adjacent to each other in the flow direction of the first fluid are arranged such that the claw of one tank body portion facing another tank body portion is not overlapped in the flow direction of the first fluid with the claw of the other tank body portion facing the one tank body portion,
the core plate has a slit between adjacent two heat exchanging units of the plurality of heat exchanging units,
the claw hole of the core plate is one of claw holes provided in the core plate,
the slit is located between adjacent two of the claw holes in the stacking direction of the tubes, one of the adjacent two claw holes is fitted with the claw of one of the adjacent two heat exchanging units of the plurality of heat exchanging units, and another of the adjacent two claw holes is fitted with the claw of another of the adjacent two heat exchanging units of the plurality of heat exchanging units,
a shortest distance between the one of the adjacent two claw holes and the slit is shorter than a shortest distance between the one of the adjacent two claw holes and one of the tube insertion holes that is closest to the one of the adjacent two claw holes among the tube insertion holes.

2. The heat exchanger according to claim 1, wherein each of the tank body portions of the plurality of heat exchanging units has the claw protruding toward the core portion.

3. The heat exchanger according to claim 1, wherein
a boundary portion is defined in the core plate between the tube joint portions of the plurality of heat exchanging units,
the claw hole of the core plate is one of claw holes provided in the boundary portion, one of the claw holes provided in the boundary portion includes:
a joint part that has a joint surface to which the claw is joined; and
a non-joint part that does not have the joint surface,
the non-joint part is disposed on a center side of the joint part in the boundary portion in the flow direction of the first fluid, and
a width of an end of the non-joint part facing the joint part is shorter in a stacking direction of the tubes than a width of an end of the claw facing the non-joint part.

4. A heat exchanger for heat exchange between a first fluid and a second fluid, the heat exchanger comprising
a plurality of heat exchanging units arranged in series with respect to a flow direction of the first fluid, wherein
each of the plurality of heat exchanging units includes:
a core portion including a stack of a plurality of tubes through which the second fluid flows; and
a header tank connected to end portions of the plurality of tubes and configured to distribute or collect the second fluid to or from the plurality of tubes,
the header tank includes:
a tube joint portion through which the plurality of tubes are inserted, the plurality of tubes being joined to the tube joint portion; and
a tank body portion defining an internal space of the tank in cooperation with the tube joint portion,
the tube joint portions of the plurality of heat exchanging units integrally constitute one core plate,
at least one of the plurality of heat exchanging units has a claw protruding from the tank body portion toward the core portion,
the core plate has a hole to be fitted with the claw,
the claw is fitted into the hole, and the tank body portion is fixed to the core plate,
a boundary portion is defined in the core plate between the tube joint portions of the plurality of heat exchanging units,
the hole of the core plate is one of holes provided in the boundary portion,
one of the holes provided in the boundary portion includes:
a joint part that has a joint surface to which the claw is joined; and
a non-joint part that does not have the joint surface,
the non-joint part is disposed on a center side of the joint part in the boundary portion in the flow direction of the first fluid, and
a width of an end of the non-joint part facing the joint part is shorter in a stacking direction of the tubes than a width of an end of the claw facing the non-joint part.

5. The heat exchanger according to claim 4, wherein the core plate has a slit between adjacent two heat exchanging units of the plurality of heat exchanging units.

6. The heat exchanger according to claim 4, wherein each of the tank body portions of the plurality of heat exchanging units has the claw protruding toward the core portion.

7. The heat exchanger according to claim 4, wherein
the core plate has a slit between adjacent two heat exchanging units of the plurality of heat exchanging units, and
the hole of the core plate is one of holes provided in the core plate,
the slit is located between two of the holes in the stacking direction of the tubes, one of the two holes is fitted with the claw of one of adjacent two heat exchanging units of the plurality of heat exchanging units, and another of the two holes is fitted with the claw of another of the adjacent two heat exchanging units of the plurality of heat exchanging units.

8. A heat exchanger for heat exchange between a first fluid and a second fluid, the heat exchanger comprising
a plurality of heat exchanging units arranged in series with respect to a flow direction of the first fluid, wherein
each of the plurality of heat exchanging units includes:
a core portion including a stack of a plurality of tubes through which the second fluid flows; and
a header tank connected to end portions of the plurality of tubes and configured to distribute or collect the second fluid to or from the plurality of tubes,
the header tank includes:
a tube joint portion having tube insertion holes through which the plurality of tubes are inserted, the plurality of tubes being joined to the tube joint portion; and
a tank body portion defining an internal space of the tank in cooperation with the tube joint portion,
the tube joint portions of the plurality of heat exchanging units integrally constitute one core plate,
at least two of the plurality of heat exchanging units have a claw protruding from the tank body portion toward the core portion,
the core plate has a claw hole to be fitted with the claw,
the claw is fitted into the claw hole, and the tank body portion is fixed to the core plate,
the tank body portions adjacent to each other in the flow direction of the first fluid are arranged such that the claw of one tank body portion facing another tank body portion is not overlapped in the flow direction of the first fluid with the claw of the other tank body portion facing the one tank body portion,
a boundary portion is defined in the core plate between the tube joint portions of the plurality of heat exchanging units,
the claw hole of the core plate is one of claw holes provided in the boundary portion,
one of the claw holes provided in the boundary portion includes:
a joint part that has a joint surface to which the claw is joined; and
a non-joint part that does not have the joint surface,
the non-joint part is disposed on a center side of the joint part in the boundary portion in the flow direction of the first fluid, and
a width of an end of the non-joint part facing the joint part is shorter in a stacking direction of the tubes than a width of an end of the claw facing the non-joint part.

* * * * *